Sept. 18, 1962 T. L. BAASCH 3,054,977
FLAKE THERMISTOR
Filed March 26, 1959
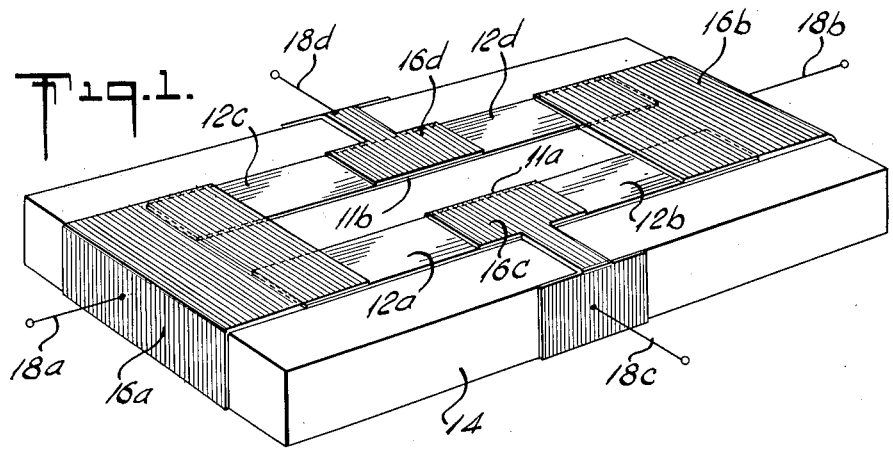
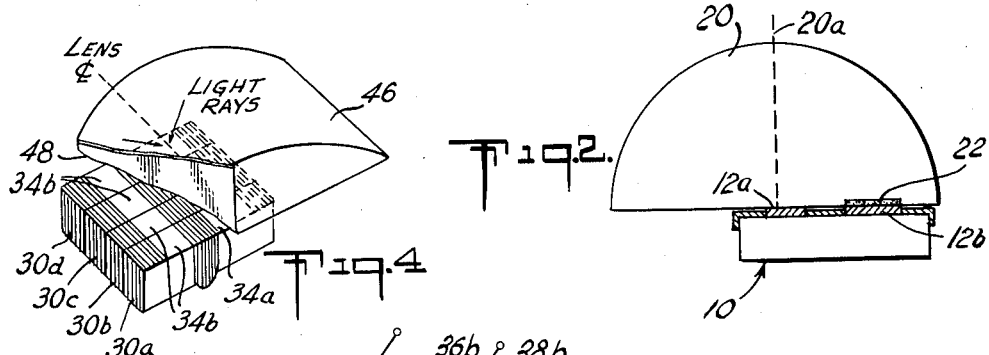
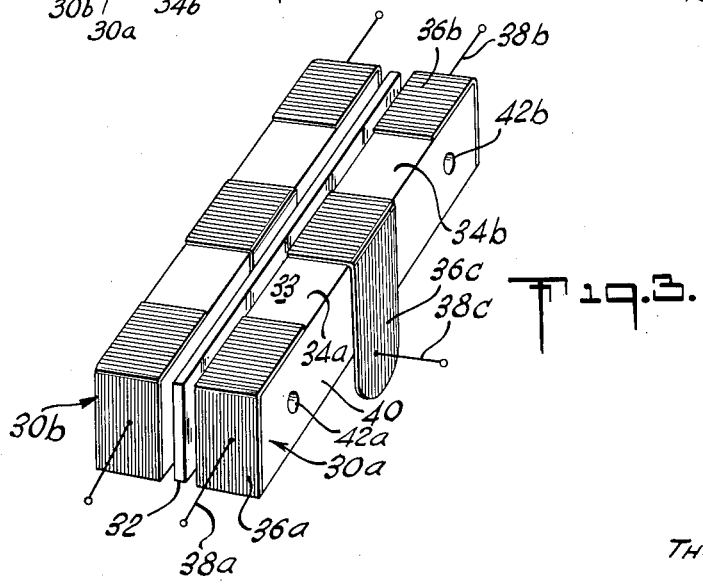
INVENTOR
THOMAS L. BAASCH
BY
ATTORNEYS United States Patent Office  3,054,977
Patented Sept. 18, 1962

3,054,977
FLAKE THERMISTOR
Thomas L. Baasch, Bayside, N.Y., assignor to Servo Corporation of America, New Hyde Park, N.Y., a corporation of New York
Filed Mar. 26, 1959, Ser. No. 802,236
12 Claims. (Cl. 338—18)

This invention pertains to bolometers and more particularly to bolometers of the thermistor type.

Thermistors are solid state elements which are semiconductive. Their most useful property is that of being thermally sensitive. In general, the resistance of the thermistor decreases with increase in temperature. When a thermistor is incorporated in an electrical circuit, such as a bridge network, a convenient heat detection device is obtainable. Thermal radiation, usually in the infra-red portion of the radiation spectrum, from a heat source is absorbed by the thermistor to raise its temperature. The rise in temperature results in a decrease of the resistance measurable by the bridge network. The balance of the bridge network is altered and an output signal is generated. By employing conventional calibration techniques, the output signal can give an indication of the temperature of the heat source.

To achieve maximum sensitivity and reliability, the thermistors are incorporated in bridge networks. A pair of thermistors are usually employed. Both thermistors are under the influence of an identical set of conditions, and one of the thermistors is operatively exposed to a heat source while the other is operatively isolated from the heat source. Thus, all physical conditions but the thermal radiation for the heat source equally affect both thermistors. Since the thermistors are disposed in a bridge network, the effect of physical conditions such as electrical noise, temperature fluctuations in the region of the thermistors, etc. are substantially neutralized.

In the known thermistor heat detectors, a pair of separate structures each including a thermistor are employed in the bridge network. Although distinct elements operate satisfactorily, the separate units add to the complexity of the assembly and unnecessarily increase the size of heat detector.

Even when the use of a bridge circuit is optional, there arises occasions when multi-channel thermistor heat detectors are required. In these multi-channel thermistor bolometer applications, it has been the practice to array a plurality of single channel bolometers. Such arrays are generally complex and difficult to assemble. When the multi-channel array is incorporated in a bridge network which requires compensating elements, the complexity and size are greatly magnified.

It is accordingly a general object of the invention to provide improved multi-element thermistor bolometers that are easily assembled.

It is another general object of the invention to provide relatively simple multi-element thermistor bolometers.

It is a specific object of one aspect of the invention to provide a compact single channel thermistor bolometer comprising an active element and a compensating element for incorporation in a bridge network.

It is a specific object of another aspect of the invention to provide a compact multi-channel thermistor bolometer having a plurality of distinct channels for heat detection.

It is a specific object of a further aspect of the invention to provide a more compact thermistor heat detector having a plurality of channels wherein each channel includes an active thermistor element and a compensating thermistor element.

It is another more specific object of this aspect of the invention to provide a basic thermistor bolometer unit that is easily and simply assembled into a multi-unit array.

Other objects and various further features of novelty and invention will be pointed out or will occur to those skilled in the art from a reading of the following specification in conjunction with the accompanying drawings. In said drawings which show, for illustrative purposes only, preferred forms of the invention:

FIG. 1 is a perspective view of a two-channel multi-element thermistor bolometer in accordance with one embodiment of the invention.

FIG. 2 is a sectional view of a lens and the multi-element thermistor bolometer assembly of FIG. 1 which permits the isolation of some of the thermistor elements from a source of heat while concentrating thermal radiation on the other of the thermistor elements.

FIG. 3 is a perspective view of multi-element thermistor bolometers suitable for assembling in an array in accordance with another embodiment of the invention; and FIG. 4 is a perspective view, partly broken away, of a lens and an array of the multi-element thermistor bolometers of FIG. 3, which permits the isolation of some of the thermistor elements from a source of heat while concentrating thermal radiation on the other of the thermistor elements.

Briefly, in accordance with a general aspect of the invention, a heat detector means is provided which comprises first and second resistance elements of thermally sensitive resistance material, i.e., a material which changes its electrical resistance with changes in the temperature of the material. A first electrically conductive element is positioned on the first resistance element for coupling to an electrical network. The conductive element may be either coated, deposited, plated or vaporized on the resistance element. A second electrically conductive element is similarly positioned on the second resistance element for coupling to the electrical network. And a third electrically conductive element is positioned on the first and second resistance elements for coupling to the electrical network. Thus, two electrical circuits are formed, one circuit includes the first and third conductive elements and the first resistance element, and the second circuit includes the second and third conductive elements and the second resistance elements.

The resistance elements can be either separate sheets of the temperature sensitive resistance material or portions of the same sheet.

In one specific aspect of the invention, the first circuit provides the active section of a thermistor bolometer and the second circuit provides the compensating section of a thermistor bolometer which are connected to a resistance bridge network.

In another specific aspect of the invention, the first and second circuits are the active elements of two distinct thermistor bolometers both connected to their own detection circuits.

In a further specific embodiment of the invention, I combine the two above cited specific aspects to form a multi-channel thermistor bolometer array in which each element has both an active and compensating element.

More particularly, FIG. 1 shows a multi-element thermistor bolometer 10 comprising two channels each including an active and a compensating element. Although the bolometer 10 is preferably intended for use in resistance bridge networks, any convenient resistance sensitive circuits may be employed.

A first channel of the bolometer 10 comprises the resistive elements 12a and 12b of a sheet 11a, and the second channel comprises the resistive elements 12c and 12d of a sheet 11b. These sheets 11(a–b) are "flakes" of a semi-conductor material having a negative temperature coefficient of resistance. The sheets 11(a–b) are fused or bonded on a heat sink 14 of a material such as quartz, glass or sapphire. However, if an electrically insulating bonding agent is employed, the heat sink 14 may be metallic.

A first conductive element 16a is fixed to corresponding edges of the resistive elements 12a and 12c, and a similar second conductive element 16b is fixed to corresponding edges of the resistive elements 12b and 12d. The other ends of elements 12(a–b) bear a conductive element 16c, and the other ends of the resistive elements 12(c–d) bear a conductive element 16d. Each of the conductive elements 16(a–d) are of a metallic material which is either coated, plated or vaporized on the sheets 11(a–b). Respectively extending from the conductive elements 16(a–d) are leads 18(a–d) for coupling to electrical networks such as bridge networks (not shown).

In particular, the resistive elements 12a and 12b may define two arms of a bridge network. The leads 18(a–b) are connected across a source of potential to establish a voltage bias across the resistive elements 12(a–b) for optimizing their sensitivity. The lead 18c is the output lead of the bridge. Similarly, the resistive elements 12(c–d) define two arms of another bridge network which are also biased. The lead 18d is the output of this second bridge network.

Initially, each bridge network is balanced, i.e. for the first channel, the resistance between the leads 18a and 18c provided by the resistive element 12a is equal to the resistance between the lead 18b and 18c provided by the resistive element 12b. It should be noted that any initial unbalance can be compensated by well known circuit techniques. In some applications, the initial unbalance is not critical since the interest may lie only in changes of balance or the rates of change of balance. It should be noted that such a configuration is insensitive to changes in the temperature in the immediate vicinity of the bolometer 10. If the temperature of the immediate surrounding region changes, each resistive element 12(a–d) experences an equal change in resistivity.

However, if the temperature of the resistive element 12a increases and the temperature of the resistive element 12b remains constant, the resistance presented by the resistive element 12a decreases while the resistance presented by the resistive element 12b remains unchanged. Since the lead 18c can be considered as the output of a potential divider, there is a corresponding change in the potential on the lead 18c. This change in potential is functionally related to the change in temperature of the resistive element 12a. Thus, by making the resistive element 12a sensitive to a remote heat source and keeping the resistive element 12b insulated from the heat source, a bolometer is obtainable which can measure the temperature of the heat source but is insensitive to ambient temperature changes. It should be noted that the same reasoning applies to the second channel which comprises the resistive elements 12(c–d) and their associated conductive elements.

FIGURE 2 shows one method of accomplishing the desired sensitization and isolation for a thermistor bolometer as shown in FIG. 1. A lens 20, preferably transparent to only infra-red radiation, is bonded to the top surface of the bolometer 10 by an electrically insulative bonding agent, so that the plane of response 20a of the lens 20 is over the active thermistor elements of the bolometer, e.g., 12a and 12c. Necessarily, therefore, the top surface of the bolometer assembly is to all intents and purposes a plane surface and the adjacent optical-element surface is likewise a plane surface, thus establishing a so-called immersed optical organization. The lens 20, which may be spherical or cylindrical, has a portion of its flat face coated with a reflective material 22. The lens 20 is positioned on the bolometer 10 so that the reflective portion of the flat face covers the compensating resistive elements, e.g., 12b and 12d. Therefore, when a heat source is located above the lens 20, its infra-red radiation is concentrated on the resistive elements 12a and 12c and blocked from the resistive elements 12b and 12d.

It should be noted that although the bolometer 10 has been shown as a two-channel thermistor bolometer wherein each channel has an active element and a compensating element, bolometers of similar construction may be manufactured having more or less channels.

Although such a construction is extremely useful, it is possible, by unitizing the construction to enhance the flexibility of the assembly. Accordingly, FIG. 3 shows a unitized thermistor bolometer which may have any desired number of channels. A two channel thermistor bolometer 30 is shown comprising two identical single channel thermistor bolometers 30(a–b) separated by a spacer 32 of mica or a similar material. While only two single channel bolometers are shown, any number may be arrayed in a similar manner.

Since the single channel bolometers are identical, only the bolometer 30a will be completely described. A sheet 33 of a temperature sensitive resistance material is bonded or fused on a heat sink 40. A conductive element 36a is fixed on one end of the sheet 33, and a conductive element 36b is fixed on the other end of the sheet 33. Fixed to the center region of the sheet 33 is a common conductive element 36c. Thus, two operative areas 34(a–b) are established on the sheet, one an active area, the other a compensating area. Leads 38(a–c) respectively extend from the conductive elements 36(a–c) for coupling to an electrical network in a similar manner as the bolometer 10 of FIG. 1.

As shown in FIG. 4, a plurality of single channel bolometers 30(a–d) are arranged in an array to provide sensitization and isolation of the resistive areas in a manner similar to that described for the bolometer of FIG. 1. In order to facilitate assembly and alignment of the bolometers 30(a–d), a pair of holes 42(a–b) are bored through each heat sink 40 (FIG. 3). After a stack is formed, the array is bolted to provide a rigid and stable assembly of any desired number of single channel thermistor bolometers.

A semi-cylindrical lens 46, preferably transparent to infra-red radiation only, is bonded to the top surface of the bolometer 30(a–d) forming, as in the arrangement of FIG. 2 an immersed optical organization. In FIG. 4, the primary response plane (corresponding to 20a in FIG. 2) of the lens is directly over the active resistive elements of the bolometers, e.g., 34a, so that the longitudinal axis of the lens is parallel to the axis of the array of single channel thermistor bolometers 30(a–d). The portion of the lens 46 which is positioned over the other or compensating resistive elements, e.g., 34b, has its flat face coated with a reflective material 48. In this manner, when a heat source is located above the lens 46, its infra-red radiation is concentrated on the resistive elements 34a and blocked from the resistive elements 34b moreover, since the optical organization is immersed, the infra-red radiation does not traverse an air gap.

It should be understood that a suitable mask may be provided with the lens arrangements of FIG. 2 or 4 in place of a reflective coating on the flat face of the lens. The mask would concentrate the infra-red radiation on the active elements and isolate the compensating elements of the bolometer.

It should be noted that, although a single sheet is employed to provide both the elements in each channel, separate sheets could be employed, one sheet serving as the active element and the other sheet serving as the compensating element. The common conductive element of each channel would bridge the gap between adjacent ends of the separate sheets.

There has thus been shown improved multi-element and multi-channel thermistor bolometers which are relatively simple and easy to assemble. The thermistor bolometers are readily incorporated in bridge networks which for maximum reliability require active and compensating elements. Furthermore, a multi-element thermistor bolometer has been disclosed which is suitable for assembling in an array of any desired number of single-channel thermistor bolometers to form a multi-channel thermistor bolometer.

While the invention has been described in detail in connection with the preferred forms illustrated, it will be understood that modifications may be made within the scope of the invention as defined in the claims which follow.

I claim:

1. A multi-channel bolometer comprising: a plurality of single channel bolometers, each of said single channel bolometers including a sheet of temperature sensitive resistance material, a first conductive element positioned on one edge of said sheet for coupling to an electrical network, a second conductive element positioned on the other edge of said sheet for coupling to the electrical network, a third conductive element positioned on a midportion of said sheet for coupling to the electrical network, and a block of heat absorbing material, said sheet being bonded to said block; a plurality of insulative spacers for interposing between pairs of said single channel bolometers; and means uniting said single channel bolometers in a unitary structure.

2. The apparatus of claim 1 wherein the portions of said sheets between said first and third conductive elements are operatively disposed with respect to a source of heat and the portions of said sheets between said second and third conductive elements are thermally insulated from said source of heat.

3. The apparatus of claim 1 wherein said single channel bolometers are disposed along a straight line.

4. The apparatus of claim 3, and further comprising means for concentrating the heat radiation from said source on the portion of each of said sheets between each of said first and third conductive elements, said means having its axis disposed parallel to said straight line.

5. A bolometer for detecting heat radiation from a heat source, comprising resistive means of elongated form and having opposing faces, said resistive means being responsive to heat radiation applied thereto, a first conductive means fixed to a first face at a first portion of said resistive means adjacent one end thereof, a second conductive means fixed to said first face at a second portion of said resistive means adjacent an end opposite to said first portion, third conductive means fixed to said first face at a midportion of said resistive means and linearly spaced from said first and second conductive means, said first, second and third conductive means being provided for electrical network coupling, a supporting member coupled to a second face of said resistive means, and means for thermally isolating the portion of said resistive means between said second and third conductive means from said heat source when said first face of said resistive means is operatively disposed with respect to said heat source.

6. The bolometer of claim 5, and further comprising means for concentrating said heat radiation on the portion of said resistive means between said first and third conductive means, said means for concentrating said heat radiation being operatively disposed with respect to the thermal isolation means.

7. The bolometer of claim 5, wherein said resistive means comprises a sheet of temperature sensitive material, said first and second conductive means being first and second conductive elements fixed to opposite ends of said sheet and said third conductive means being a third conductive element fixed to the midportion of said sheet.

8. The arrangement of claim 5 in which said bolometer has two channels, said resistive means comprising first and second sheets of temperature sensitive material, said first and second conductive means comprising a first conductive element fixed to said first and second sheets at one end thereof and a second conductive element fixed to said first and second sheets at the opposite end thereof, and said third conductive means comprises third and fourth conductive elements fixed at the midportions of said first and second sheets respectively, said first and third elements, said first and fourth elements, said second and third elements and said second and fourth elements each defining an electrical circuit including a portion of one of said sheets.

9. The bolometer of claim 6, wherein the concentrating means comprises a lens bonded to said bolometer and having its optical axis aligned with said portion of said resistive means between said first and third conductive means, and said thermal isolation means comprises a heat radiation reflective coating bonded to the portion of said lens overlaying said portion of said resistive means between said second and third conductive means, and said supporting member comprises a heat sink thermally coupled to said second face of said resistive means.

10. The bolometer of claim 7, wherein said first, second and third conductive elements are provided for coupling to an electrical network, a first electrical circuit being established between said first and third conductive elements by the intervening portion of said sheet and a second electrical circuit being established between said second and third conductive elements by the intervening portion of said sheet.

11. The bolometer of claim 8, and further comprising means for concentrating said heat radiation on the portion of said resistive means between said first and third conductive means and said first and fourth conductive elements, said means for concentrating said heat radiation being operatively disposed with respect to the thermal isolation means.

12. The bolometer of claim 11, wherein the concentrating means comprises a lens bonded to said bolometer and having its optical axis aligned with said portion of said resistive means between said first and third conductive means, and said thermal isolation means comprises a heat radiation reflective coating bonded to the portion of said lens overlaying said portion of said resistive means between said second and third conductive means, and said supporting member comprises a heat sink thermally coupled to said second face of said resistive means.

References Cited in the file of this patent

UNITED STATES PATENTS

| | | |
|---|---|---|
| 2,414,792 | Becker | Jan. 28, 1947 |
| 2,668,867 | Ekstein | Feb. 9, 1954 |
| 2,711,464 | Anderson et al. | June 21, 1955 |
| 2,779,811 | Picciano et al. | Jan. 29, 1957 |
| 2,788,381 | Baldwin | Apr. 9, 1957 |
| 2,823,245 | Solow | Feb. 11, 1958 |
| 2,852,648 | Duffield | Sept. 16, 1958 |